(12) United States Patent
d"Eon et al.

(10) Patent No.: US 11,593,988 B2
(45) Date of Patent: Feb. 28, 2023

(54) FRACTIONAL VISIBILITY ESTIMATION USING PARTICLE DENSITY FOR LIGHT TRANSPORT SIMULATION

(71) Applicant: NVIDIA Corporation, Santa Clara, CA (US)

(72) Inventors: Eugene d"Eon, Foster City, CA (US); Jan Novak, Meilen (CH); Jacopo Pantaleoni, Berlin (DE); Niko Markus Kettunen, Zurich (CH)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 17/169,785

(22) Filed: Feb. 8, 2021

(65) Prior Publication Data
US 2022/0254099 A1    Aug. 11, 2022

(51) Int. Cl.
G06T 15/50    (2011.01)
G06T 15/00    (2011.01)
G06F 9/455    (2018.01)

(52) U.S. Cl.
CPC ........ G06T 15/506 (2013.01); G06F 9/45558 (2013.01); G06T 15/005 (2013.01); G06F 2009/4557 (2013.01); G06F 2009/45583 (2013.01)

(58) Field of Classification Search
CPC . G06T 15/506; G06T 15/005; G06F 9/45558; G06F 2009/4557; G06F 2009/45583
See application file for complete search history.

(56) References Cited

U.S. PATENT DOCUMENTS

2018/0114355 A1* 4/2018 Kutz ................. G06T 15/08

OTHER PUBLICATIONS

Jonsson et al., Direct Transmittance Estimation in Heterogeneous Participating Media Using Approximated Taylor Expansions, IEEE Transactions on Visualization and Computer Graphics, Nov. 2, 2020, (vol. PP, Issue: 99) (Year: 2020).*
Georgiev et al, "Integral formulations of volumetric transmittance", ACM Trans. Graph., vol. 38, No. 6, Article 154, Nov. 2019 (Year: 2019).*

(Continued)

Primary Examiner — Jennifer Mehmood
Assistant Examiner — Donna J. Ricks
(74) Attorney, Agent, or Firm — Taylor English Duma L.L.P.

(57) ABSTRACT

In various examples, transmittance may be computed using a power-series expansion of an exponential integral of a density function. A term of the power-series expansion may be evaluated as a combination of values of the term for different orderings of samples in the power-series expansion. A sample may be computed from a combination of values at spaced intervals along the function and a discontinuity may be compensated for based at least on determining a version of the function that includes an alignment of a first point with a second point of the function. Rather than arbitrarily or manually selecting a pivot used to expand the power-series, the pivot may be computed as an average of values of the function. The transmittance estimation may be computed from the power-series expansion using a value used to compute the pivot (for a biased estimate) or using all different values (for an unbiased estimate).

20 Claims, 9 Drawing Sheets

(56) References Cited

OTHER PUBLICATIONS

Lyne et al., "On Russian Roulette Estimates for Bayesian Inference with Doubly-Intractable Likelihoods," Statistical Science, vol. 30, No. 4, pp. 443-467 (2015), (Year: 2016).*
D'Eon et al., Rotated recursive power-series Poisson estimators for unbiased transmittance estimation, NVIDIA, (Sep. 2020). (Year: 2020).*
Beskos, A., et al., "Exact and computationally etticient likelihood-based estimation for discretely observed diffusion processes (with discussion)," Journal of the Royal Statistical Society: Series B (Statistical Methodology), vol. 68, No. 3, pp. 333-382 (2006).
Bhanot, G., and Kennedy, A.D., "Bosonic lattice gauge theory with noise," Physics letters B, vol. 157, No. 1, pp. 70-76 (1985).
Booth, T.E., "Unbiased Monte Carlo estimation of the reciprocal of an integral," Nuclear science and engineering, vol. 156, No. 3, pp. 403-407 (2007).
Cameron, R. H., "The generalized heat flow equation and a corresponding Poisson formula," Annals of Mathematics, vol. 59, No. 3, pp. 434-462 (1954).
Chen, N., and Huang, Z., "Brownian meanders, importance sampling and unbiased simulation of diffusion extremes," Operations research letters, vol. 40, No. 6, pp. 554-563 (2012).
Cramer, S. N., "Application of the fictitious scattering radiation transport model for deep-penetration Monte Carlo calculations," Nuclear Science and Engineering, vol. 65, No. 2, pp. 237-253 (1978).
D'Eon, E., et al., "Rotated recursive power-series Poisson estimators for unbiased transmittance estimation," NVIDIA Confidential, pp. 11 (Sep. 2020).
El-Hafi, M., et al., "Three viewpoints on null-collision Monte Carlo algorithms," In CTRPM-VI-6th Computational Thermal Radiation in Participating Media VI, pp. 8 (2018).
Fearnhead, P., et al., "Particle filters for partially observed diffusions," Journal of the Royal Statistical Society: Series B (Statistical Methodology), vol. 70, No. 4, pp. 755-777 (2008).
Georgiev, I., et al., "Integral formulations of volumetric transmittance," ACM Transactions on Graphics (Proceedings of SIGGRAPH Asia), vol. 38, No. 6, pp. 17 (Nov. 2019).
Girolami, M., et al., "Playing Russian roulette with intractable likelihoods," arXiv preprintarXiv:1306.4032, pp. 22 (2013).
Jacob, P.E., and Thiery, A.H., "On nonnegative unbiased estimators," The Annals of Statistics, vol. 43, No. 2, pp. 769-784 (2015).
Lee, A., et al., "Unbiased approximations of products of expectations," Biometrika, vol. 106, No. 3, pp. 708-715 (2019).
Longo, S., "Direct derivation of Skullerud's Monte Carlo method for charged particle transport from the linear Boltzmann equation," Physica A: Statistical Mechanics and its Applications, vol. 313, No. 3-4, pp. 389-396 (2002).
Lyne, A-M, et al., "On Russian roulette estimates for Bayesian inference with doubly-intractable likelihoods," Statistical science, vol. 30, No. 4, pp. 443-467 (2015).
Moka, S.B., et al., "Unbiased estimation of the reciprocal mean for non-negative random variables," In 2019 Winter Simulation Conference (WSC), IEEE, pp. 404-415 (2019).
Novak, J., et al., "Monte Cado Methods for Volumetric Light Transport Simulation," Computer Graphics Forum, Proceedings of Eurographics—State of the Art Reports, vol. 37, No. 2, pp. 26 (2018).
Novak, J., et al., "Residual ratio tracking for estimating attenuation in participating media," ACM Transactions on Graphics, vol. 33, No. 6, Article No. 179, pp. 11 (2014).
Papaspiliopoulos, O., "Monte Cado probabilistic inference for diffusion processes: A methodological framework," Bayesian time series models, pp. 91-112 (2011).
Pasupathy, R., "Generating nonhomogeneous Poisson processes," Wiley encyclopedia of operations research and management science, pp. 1-11 (2010).
Pauly, M., et al., "Metropolis Light Transport for Participating Media," Rendering Techniques 2000, pp. 11-22 (2000).
Raab, M., et al., "Unbiased Global Illumination with Participating Media," In Monte Cado and Quasi Monte Carlo Methods 2006, Springer, pp. 591-601 (2006).
Rainforth, T., et al., "On the opportunities and pitfalls of nesting Monte Carlo estimators," arXiv preprint arXiv:1709.06181, pp. 38 (2017).
Wagner, W., "Monte Carlo evaluation of functionals of solutions of stochastic differential equations. Variance reduction and numerical examples," Stochastic Analysis and Applications, vol. 6, No. 4, pp. 447-468 (1988).
Wagner, W., "Unbiased Monte Carlo evaluation of certain functional integrals," J. Comput. Phys., vol. 71, No. 1, pp. 21-33 (1987).

* cited by examiner

FRACTIONAL VISIBILITY ESTIMATION USING PARTICLE DENSITY FOR LIGHT TRANSPORT SIMULATION

BACKGROUND

The world around us is filled with participating media that attenuates and scatters light as it travels from light sources—to surfaces—and finally to our eyes. Simulating this transport in heterogeneous participating media—such as smoke, clouds, nuclear reactor housings, biological tissue, or other volumetric datasets—is important in many fields, ranging from neutron transport, to medical physics, scientific visualization, and film and visual effects. Central to these simulations is the relatively expensive computation of the transmittance (fractional visibility) between two given points through the media. In the context of graphics rendering, the transmittance may be used for shadow connections between light- and camera-subpaths, for rendering colored media, or for evaluating the fractional visibility to solid surfaces.

Transmittance estimation is traditionally formulated as an exponential of the medium optical thickness, i.e. integrated extinction, along the line segment connecting the points. Most existing unbiased transmittance estimators are based on "null-scattering" random walks—enabled by augmenting the media with fictitious matter. A transmittance estimator has been formulated that leverages unbiased Monte Carlo estimation. However, the estimator is limited due to the amount of variance in its estimations and the marginal effect that increasing the number of samples has on reducing the variance. As such, using the estimator may require averaging many calls to the same estimator, resulting in extended render times and in turn many computationally expensive lookups of values in memory, resulting in extended render times.

SUMMARY

Embodiments of the present disclosure relate to fractional visibility estimation using particle density for light transport simulation. Systems and methods are disclosed that determine transmittance using a function that corresponds to density of particles at locations in an environment. The transmittance may be computed using a power-series expansion of an exponential integral of the function, allowing for Monte Carlo estimation by sampling the function and applying the samples to terms of the power-series expansion.

In contrast to traditional approaches for computing transmittance, at least one embodiment may, at least a term of the power-series expansion may be evaluated as a combination of values of the term for different orderings of samples of the function in the power-series expansion. Values of terms of the power-series expansion may be computed using elementary symmetric means, allowing for all of the potential orderings to be evaluated efficiently, or a subset of the potential orderings may be computed. Also in contrast to traditional approaches for computing transmittance, a sample of the function may be computed from a combination of values at spaced intervals along the function. A discontinuity may be compensated for based at least on determining a version of the function that includes an alignment of a first point with a second point of the function (e.g., using an affine control variate). One or more samples may be applied to that version of the function to produce an output that is adjusted to compensate for the alignment and determine the transmittance. In further contrast to traditional approaches for computing transmittance, rather than arbitrarily or manually selecting a pivot used to expand the power-series, the pivot may be computed as an average of values of the function. The transmittance estimation may be computed from the power-series expansion using one or more of the values that were used to compute the pivot (for a biased estimate) or using all different values of the function than used to compute the pivot (for an unbiased estimate).

BRIEF DESCRIPTION OF THE DRAWINGS

The present systems and methods for fractional visibility estimation using particle density for light transport simulation are described in detail below with reference to the attached drawing figures, wherein.

DETAILED DESCRIPTION

Figure 1:
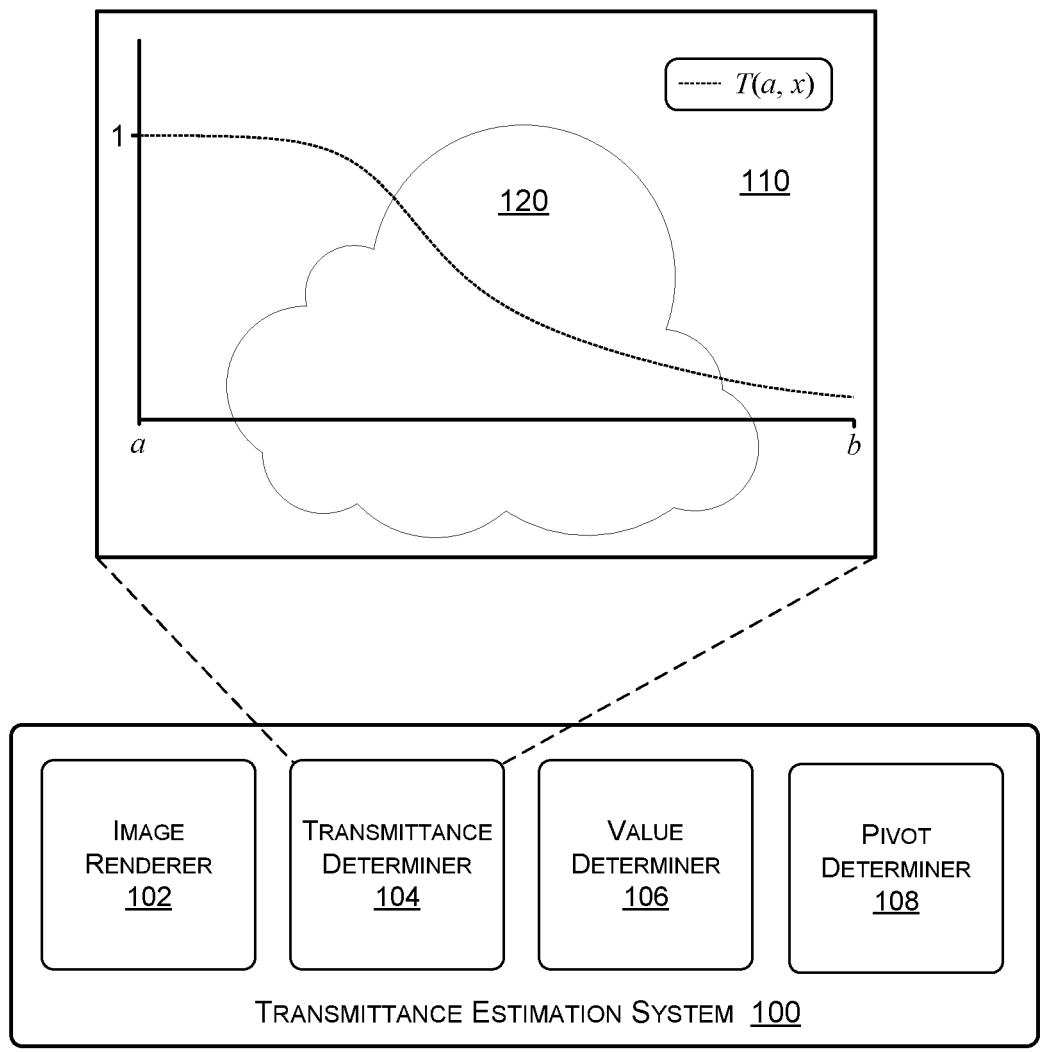
FIG. 1 is a block diagram of an example transmission estimation system, in accordance with at least one embodiment of the present disclosure.

Systems and methods are disclosed related to fractional visibility estimation using particle density for light transport simulation. More specifically, the current disclosure relates to approaches for estimating transmittance that can be used to achieve low variance, as well as variance that improves with the number of samples used to compute the transmittance. In accordance with aspects of the disclosure, transmittance may be determined using a function that corresponds to density of particles at locations in an environment. The transmittance may be computed using a power-series (e.g., Taylor series) expansion of an exponential integral of the function, allowing for Monte Carlo estimation by sampling the function and applying the samples to terms of the power-series expansion.

In contrast to traditional approaches for computing transmittance, at least one embodiment may, at least a term of the power-series expansion may be evaluated as a combination of values of the term for different orderings of samples of the function in the power-series expansion. This approach may be used to produce a value of the term that is effectively a combination of multiple estimators, thereby reducing variance and allowing for fewer samples to be looked up in memory. For example, each term of the power-series expansion may include one or more variables, where each variable corresponds to a respective sample from a density function. An order of the samples may correspond to a unique assignment of the samples to the variables. A different ordering of the samples may effectively provide another valid estimation of transmittance and/or of a term of the power-series expansion. For example, in embodiments where the samples are statistically independent (uncorrelated), an average of values of the term for different orderings of the samples may result in an unbiased estimation of the transmittance. Additionally, using disclosed approaches, increasing the number of samples may have a large impact on reducing the variance, as multiple samples may be applied to a term of the power-series that has a significant impact on the transmittance (e.g., the first and/or second terms or powers of the power-series).

In embodiments, the transmittance may be computed using any number of potential orderings of samples in the power-series expansion and/or for one or more particular terms thereof. For example, all potential orderings of the samples in each term that is evaluated may be used to maximize lookups used to determine the samples, or a subset of the potential orderings may be used. Given N terms of a power-series expansion (e.g., determined by truncating the power-series expansion using Russian roulette), evaluating each ordering may result in $2^N$ computations of term values, which rapidly increases computations with the number of terms. In accordance with the disclosure, various approaches may be used to mitigate the number of computations used to estimate the transmittance. In some examples, values of terms of the power-series expansion may be computed using elementary symmetric sums of the plurality of samples. For example, the elementary symmetric sums may be used to compute elementary symmetric means, allowing for all of the potential orderings to be evaluated without using $2^N$ computations. In further examples, a subset of the potential orderings may be computed. For example, a plurality of terms of the power-series expansion may be evaluated based at least on applying the plurality of samples to the power-series expansion while shifting orders of the plurality of samples in the power-series expansion. Given slots of variables, M samples may be shifted or rotated amongst the slots (e.g., clockwise or counter clockwise) M times, so that each sample occupies a different slot for each ordering.

Also in contrast to traditional approaches for computing transmittance, a sample of the function may be computed from a combination of values at spaced intervals along the function. For example, the values may be determined at equally spaced intervals along the function, and the sample may be an average of the values. In at least one embodiment, the spacing of the values for a sample may shift and loop the function, which may cause a discontinuity in the integration domain of the function due to differences between values at the beginning and end of the function. For example, a randomized low-discrepancy set of values may be produced using a Cranley-Patterson rotation, which when used with equidistant sampling can decrease integration error as the square of the sample count. However, this assumes that the integrand has a finite maximum slope, which can be violated by a discontinuity that significantly reduces the convergence rate. In accordance with aspects of the disclosure, a discontinuity may be compensated for based at least on determining a version of the function that includes an alignment of a first point with a second point of the function to produce a new density function with the same integral as the original function. A sample(s) may be applied to that version of the function to produce an output that is adjusted to compensate for the alignment and determine the transmittance. In at least one embodiment, the version of the function may comprise an affine control variate that performs the alignment. Another approach to aligning the points of the function includes averaging the function with itself reversed. This may be used as an alternative to a control variate, for example, to avoid negative values that may result from using the control variate.

In further contrast to traditional approaches for computing transmittance, the disclosure provides approaches for determining a pivot used to expand the power-series of an exponential integral of a function. Choosing an accurate pivot can reduce the dependency of the transmittance estimation on higher order terms in the power-series expansion. This may allow for increased computational efficiency by evaluating fewer terms. Rather than arbitrarily or manually selecting the pivot, the pivot may be computed based at least in part on a combination of values of the function. For example, the pivot may correspond to an average of the values of the function. In at least one embodiment, the transmittance estimation is computed from the power-series expansion using one or more of the values that were used to compute the pivot. However, this may result in a biased estimation of the transmittance. For an unbiased estimation, the transmittance may be computed using all different values of the function than used to compute the pivot.

With reference to FIG. 1, FIG. 1 is an example transmittance estimation system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 8:
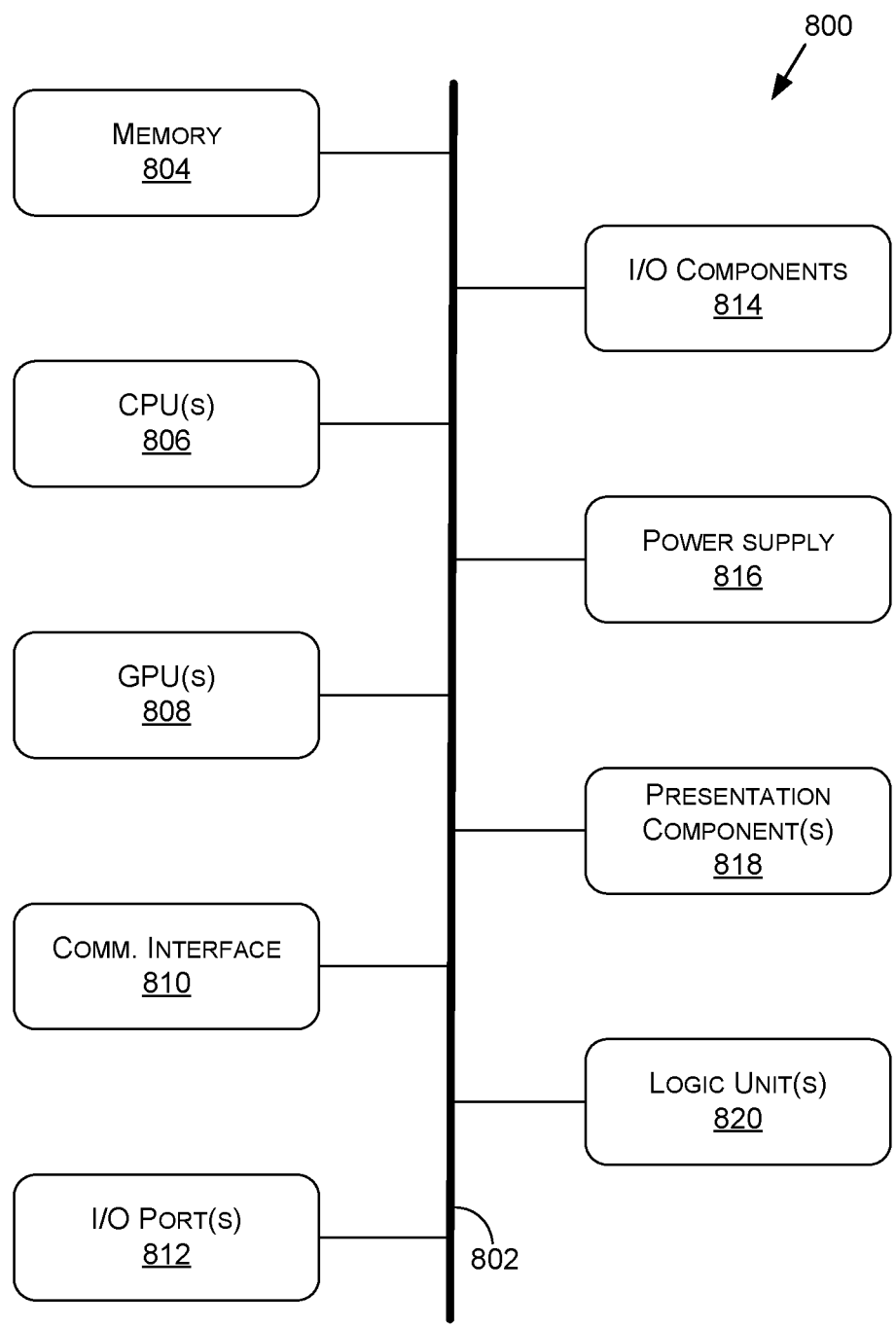
FIG. 8 is a block diagram of an example computing device suitable for use in implementing some embodiments of the present disclosure.
Figure 9:
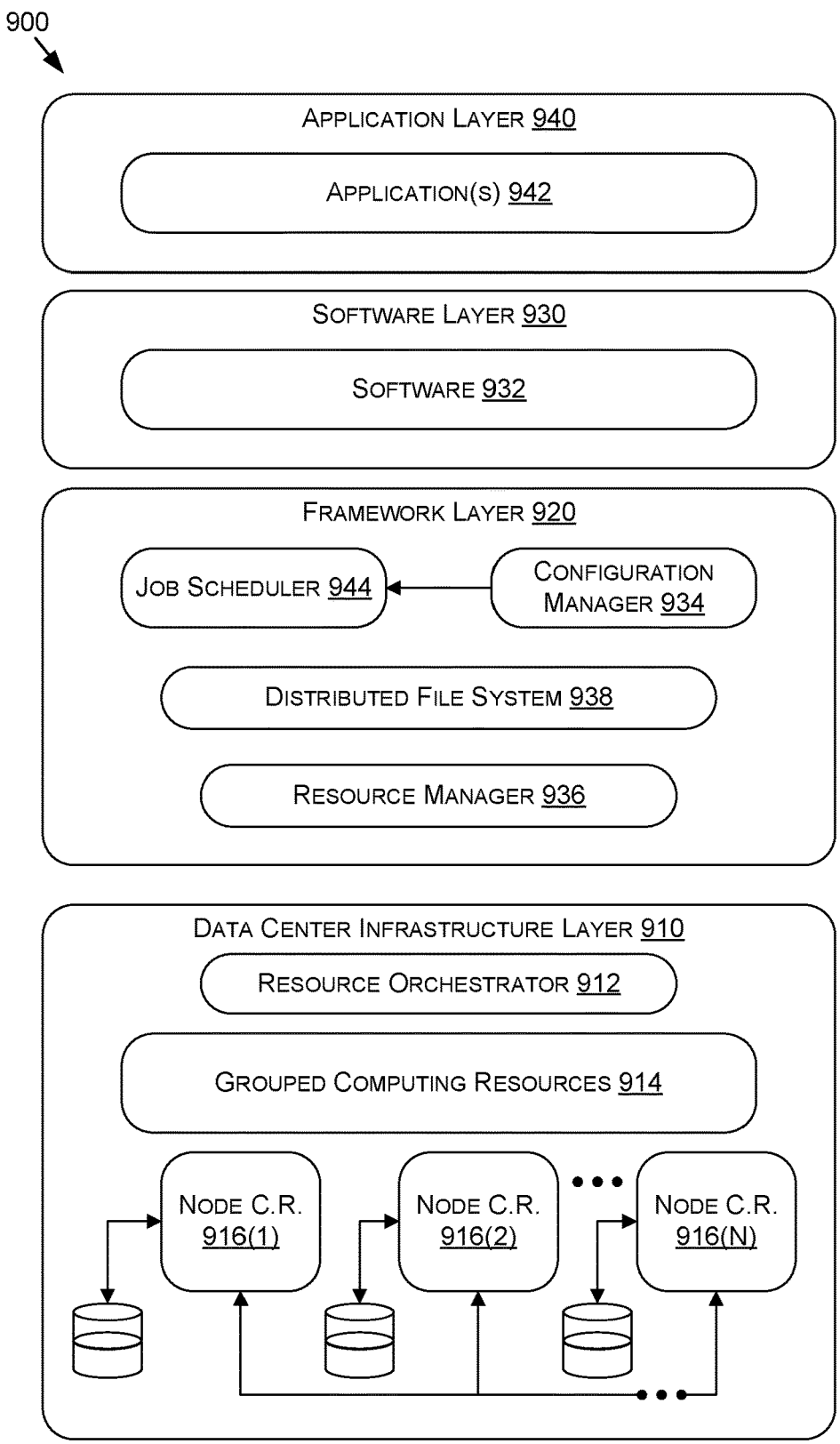
FIG. 9 is a block diagram of an example data center suitable for use in implementing some embodiments of the present disclosure.

In some embodiments, features, functionality, and/or components of the transmittance estimation system 100 may be similar to those of computing device 800 of FIG. 8 and/or the data center 900 of FIG. 9. In one or more embodiments, the transmittance estimation system 100 may correspond to simulation applications, and the methods described herein may be executed by one or more servers to render graphical output for simulation applications, such as those used for testing and validating autonomous navigation machines or applications, or for content generation applications including animation and computer-aided design. The graphical output produced may be streamed or otherwise transmitted to one or more client devices, including, for example and without limitation, client devices used in simulation applications such as: one or more software components in the loop, one or more hardware components in the loop (HIL), one or more platform components in the loop (PIL), one or more systems in the loop (SIL), or any combinations thereof.

The transmittance estimation system 100 may include, among other things, an image renderer 102, a transmittance determiner 104, a value determiner 106, and a pivot determiner 108.

As an overview, the image renderer 102 may be configured to render images (e.g., frames) of Three-Dimensional (3D) scenes—such as a scene 110 of a virtual environment. To render an image of a 3D scene, the image renderer 102 may employ the transmittance determiner 104, the value determiner 106, and the pivot determiner 108. For example, the image renderer 102 may use the transmittance determiner 104 that evaluates transmittance of heterogeneous participating media within the scene, an example of which includes medium 120. The transmittance determiner 104 may determine the transmittance with respect to a function that corresponds to density of particles at locations in the 3D scene (e.g., within the medium 120). To do so, the transmittance determiner 104 may employ the value determiner 106 that determines one or more values of the function at corresponding locations in the 3D scene. For example, one or more values may be used to compute the transmittance based on applying the one or more values to at least a term of a power-series expansion of an exponential integral of the function. The transmittance determiner 104 may also, in at least one embodiment, employ the pivot determiner 108 that determines a pivot the transmittance determiner 104 uses to expand the power-series to form the power-series expansion. For example, one or more values from the value determiner 106 may be used by the pivot determiner 108 to compute the pivot.

In various embodiments, the image renderer 102 may render frames of the scene 110, using any suitable approach that relies upon determining the transmittance through one or more media. In some examples, the image renderer 102 uses rays to sample lighting conditions of a virtual environment (e.g., to generate solutions to the rendering equation for pixels). One or more of these solution may be determined based at least on transmittance(s) computed using the transmittance determiner 104. In various embodiments, the image renderer 102 may use the transmittance determiner 104 to simulate the transport of light through the one or more media (e.g., the medium 120), examples of which include one or more of a cloud, haze, smoke, fog, rain, or snow.

As described herein, the transmittance determiner 104 may determine the transmittance with respect to a function that corresponds to density of particles at locations in the 3D scene (e.g., within the medium 120). In at least one embodiment, the function $\mu(x)$ may be used to compute the transmittance T over a finite interval between location a and location b using Equation (1):

$$T(a, b) = \exp\left(-\int_a^b \mu(x)dx\right) \qquad (1)$$

where x is a location along a line. The function $\mu(x)$ may be, for example, any non-negative function in (a, b) and may be deterministic (e.g., light transport in classical non-uniform participating media) or may be a deterministic functional of a random process (e.g., light transport in non-classical random media useful in applications for physics and finance).

The transmittance T(a, b) may represent a dimensionless probability of flying collisionless between the locations a and b in the medium 120. In rendering the scene 110, the image renderer 102 may be provided with volumes of nonhomogeneous densities given by procedural noise functions or values contained in voxel grid structures. In order to determine the transmittance, the probabilities may need to be estimated, for example, so that the image renderer 102 may fractionally attenuate visibility during Next Event-Estimation (NEE) or compute transmission probabilities through non-scattering media (e.g., black smoke) when forming random walks through the scene 110. It may be desirable to perform the estimations using an unbiased framework, or at least a framework that is capable of unbiased estimation. In various examples, the image renderer 102 may accomplish this by applying Monte Carlo estimation to Equation (1). In particular, one or more embodiments may employ Monte Carlo estimation of the exponentiated integral of Equation (1).

The transmittance determiner 104 may evaluate an estimator of equation 1 as a power-series expansion of the exponential integral of the function $\mu(x)$. Transmittance may be expressed using Equation (2):

$$T(a, b) = e^{-\int_a^b \mu(x)dx} = e^{-\tau} \sum_{k=0}^{\infty} \frac{(-\tau)^k}{k!} \qquad (2)$$

$$= e^{-\int_a^b \mu(x)dx} \exp\left[\int_a^b (\bar{\mu}(x) - \mu(x))dx\right]$$

$$= e^{-\tau} e^{\tau_n} = e^{-\tau} \sum_{k=0}^{\infty} \frac{\tau_n^k}{k!}$$

where the function $\bar{\mu}(x)$ acts as a control variate for the integral of the function $\mu(x)$ and the integral $\bar{\tau}$ is of the function $\bar{\mu}(x)$. The integral $\bar{\tau}$ may be an analytical integral and act as a pivot, or expansion point, for a power-series (e.g., a Taylor series). The power-series expansion may be based on, for example, Equation (3):

$$e^{\mathbb{E}[X]} = \mathbb{E}\left[1 + \frac{X_1}{1!} + \frac{X_1 X_2}{2!} + \frac{X_1 X_2 X_3}{3!} + \cdots \right] \qquad (3)$$

$$= \sum_{k=0}^{\infty} \frac{1}{k!} \mathbb{E}\left|\prod_i^k X_i\right|$$

where $X_i$ may refer to the $i^{th}$ sample estimate of the integral $\tau_n$. The power-series may converge with fewer terms the closer the integral $\bar{\tau}$ is to the real integral of the function μ(x). In at least one embodiment, each sample may be determined using an unbiased and independent selection algorithm (e.g., random selection).

While the power-series expansion may include an infinite number of terms, in practice, the transmittance determiner 104 may evaluate a finite number of terms. For example, and without limitation, the transmittance determiner 104 may truncate the power-series expansion stochastically using Russian roulette integration in Monte Carlo integration.

Transmittance T may be estimated based on the Equation (3) by sampling an evaluation order N of the power-series by roulette, then evaluating Equation (4):

$$T \approx 1 + \frac{X_1}{1! \, p_1} + \frac{X_1 X_2}{2! \, p_2} + \cdots + \frac{X_1 \cdots X_N}{N! \, p_N} \quad (4)$$

where $p_i$ is the probability of evaluating at least i orders. However, this expression does not use the samples maximally, as some samples are given much more weight than others. For example, sample $X_1$ receives a significantly higher weight than any other sample as it is included in each term and the denominator of other terms grows with the order of the terms.

Combination Estimators

In accordance with aspects of the disclosure, the weights of samples in estimating transmittance may be equally weighted, or at least more equally weighted, by evaluating at least a term of the power-series expansion (e.g., each term) as a combination of values of the term for different orderings of samples from the plurality of samples in the power-series expansion. For example, in the first term $$\frac{X_1}{1! \, p_1}$$

a combination of at least two samples may be used in place of $X_1$. In at least one embodiment, $X_1$ may be replaced with a mean $m_1$ of the samples according to equation (5):

$$m_1 := \frac{X_1 + \cdots + X_N}{N} \quad (5)$$

Similarly, a combination of at least two samples may be used in place of $X_2$ and/or any other term in the power-series. For example, in at least one embodiment, $X_2$ may be replaced with a mean $m_2$ of all combinations of two-sample products the samples according to equation (5):

$$m_2 := \frac{X_1 X_2 + \cdots + X_1 X_N + X_2 X_3 + \cdots X_{N-1} X_N}{\binom{N}{2}} \quad (6)$$

Generalizing this concept, where a term Y of the power-series includes a product of Z variables of the power-series, the transmittance determiner 104 may evaluate the term Y as a combination (e.g., average) of all possible Z-products that can be formed from M samples. Viewed another way, the power-series expansion may include slots for the variables. An order of the samples may correspond to a unique assignment of the samples to the variables (e.g., sample 1 is $X_1$ in one ordering and sample 1 is $X_2$ in another ordering). For at least one term Y, M samples may be assigned different orderings and the results may be combined to compute the transmittance.

In embodiments, the transmittance may correspond to the mean value over all permutations of the Z variables of $X_1$ in the Equation (4). This forms the mean of several correlated estimators and reduces the variance while remaining unbiased and requires no additional lookups in the medium 120. The sums of the products of all combinations of a given length Y may be referred to as elementary symmetric sums and denoted $e_k$. In mathematical form, the elementary symmetric sums may be denoted using Equation (7):

$$e_k := \sum_{1 \le i_1 < \cdots < i_k \le N} x_{i_1} \cdots x_{i_k} \quad (7)$$

with $e_0$ being assigned to 1. Elementary symmetrical means $m_k$, may then be denoted using Equation (8):

$$m^k = \frac{e_k}{\binom{N}{k}} \quad (8)$$

and a combination transmittance estimator may then be denoted using Equation (9)

$$T \approx 1 + \frac{m_1}{1! \, p_1} + \frac{m_2}{2! \, p_2} + \cdots + \frac{m_N}{N! \, p_N} \quad (9)$$

with the evaluation order N being determined using a selection method such as Russian roulette integration or another random or pseudorandom method.

Given N terms, or orders, of the power-series expansion evaluating Equation (9) may result in $2^N$ computations of term values, which rapidly increases computations with the number of terms. In accordance with the disclosure, various approaches may be used to mitigate the number of computations used to estimate the transmittance. However, Girard-Newton formulas may be used to evaluate elementary symmetric sums. Where $P_k$ may be the sums of k'th powers of the samples, $P_k = \sum_{i=1}^{N} x_i^k$ and $e_k$ may be the elemental symmetric sums, the Girard-Newton formulas may define Equation (10):

$$k e_k = \sum_{i=1}^{k} (-1)^{i-1} e_{k-i} P_i \quad (10)$$

where $e_k$ may be solved for to compute the elementary symmetric sums of M samples up to given order N, thereby avoiding an exponential rise in computations with the number of orders. The elementary symmetric sums may be used to compute elementary symmetric means, which may be used to compute the transmittance (e.g., achieving O(NM) complexity rather than $O(2^N)$).

Figure 2A:
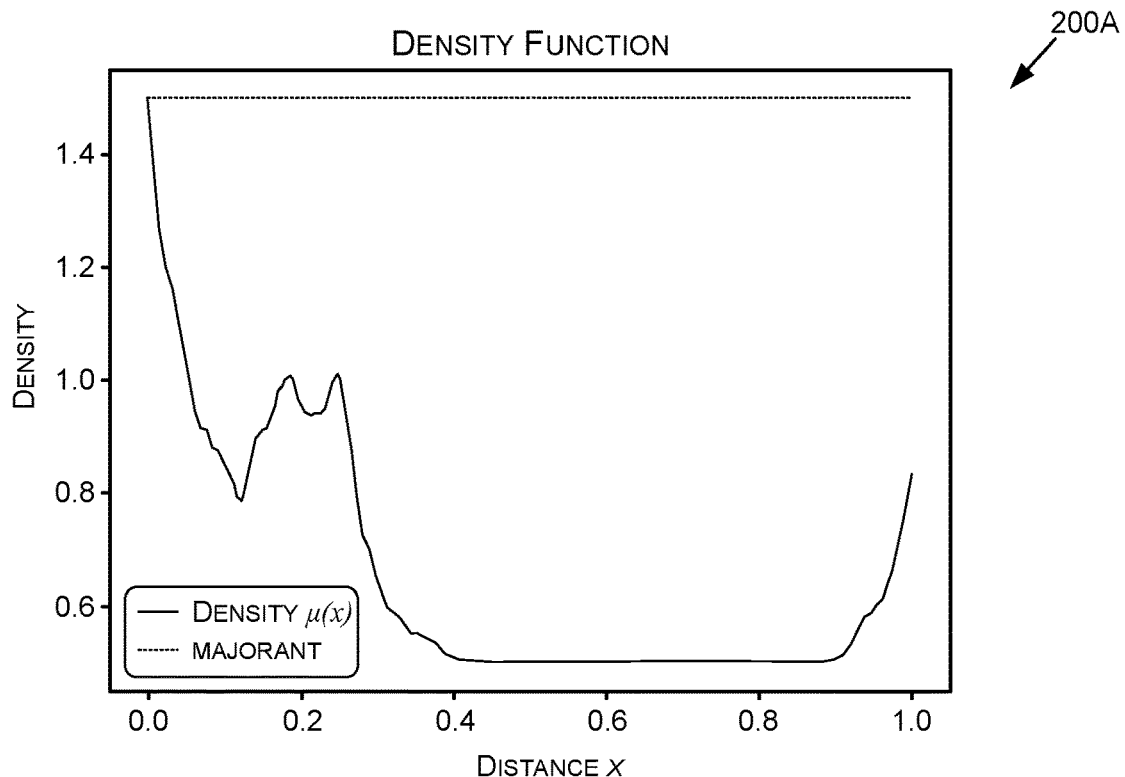
FIG. 2A is a graph of an example density function and majorant thereof, in accordance with at least one embodiment of the present disclosure.
Figure 2B:
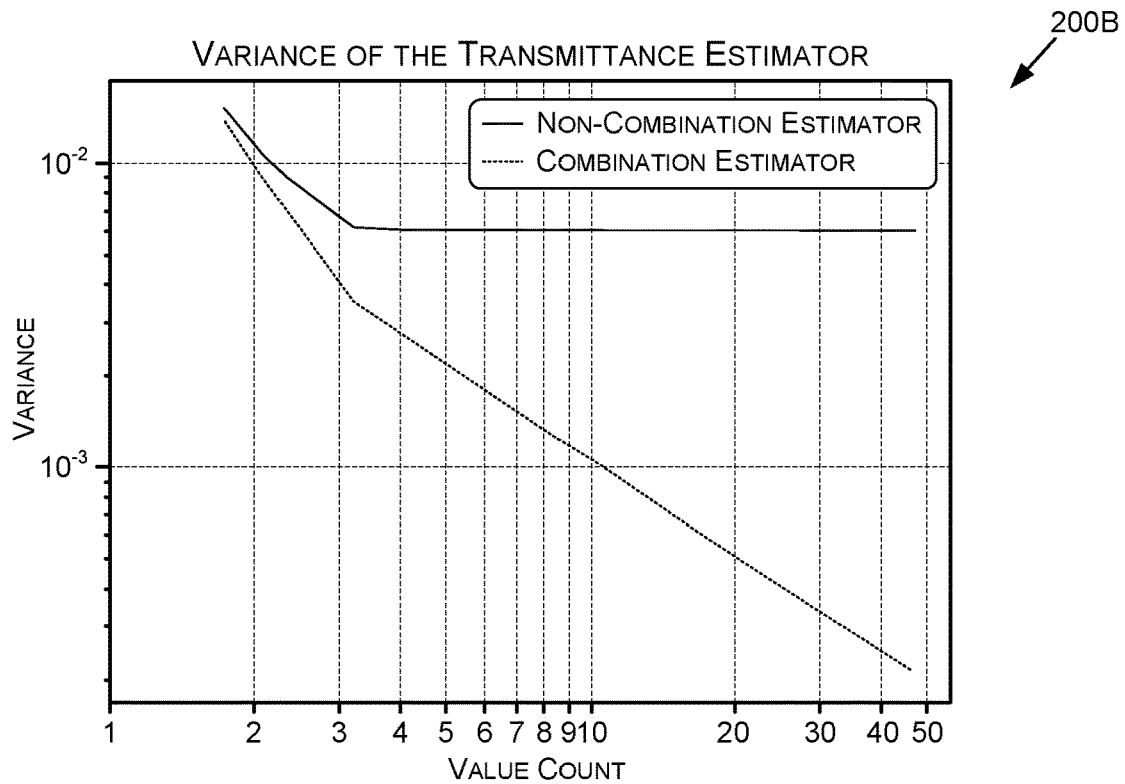
FIG. 2B is a graph of variance for different estimators versus the number of values used from the example density function of FIG. 2A in transmittance estimation, in accordance with at least one embodiment of the present disclosure.

Referring now to FIGS. 2A and 2B, FIG. 2A is a graph 200A of an example density function μ(x) and majorant thereof, in accordance with at least one embodiment of the present disclosure and FIG. 2B is a graph 200B of variance for different estimator versus the number of values (e.g., samples) used from the example density function μ(x) of FIG. 2A in transmittance estimation, in accordance with at least one embodiment of the present disclosure.

As can be seen, using a non-combination estimator that employs a single ordering of samples and variable slots, improvements to variance may essentially plateau at around 4 values or samples due to the denominator of the terms of the power-series expansion growing with the order of the terms. In contrast, using, for example, a combination estimator that accounts for multiple orderings for one or more terms—such as all potential orderings for all terms evaluated in FIG. 2B—the variance may improve continuously as the number of values or samples is increased.

In further examples, a subset of the potential orderings of the samples in the power-series expansion may be computed in order to avoid an exponential complexity in computations of transmittance. For example and without limitation, in some approaches a plurality of terms of the power-series expansion may be evaluated based at least on applying the plurality of samples to the power-series expansion while shifting orders of the plurality of samples in the power-series expansion. Given slots of variables, the M samples may be shifted or rotated amongst the slots (e.g., clockwise or counter clockwise) M times, so that each sample occupies a different slot for each ordering. For example, the ordered sequences that are computed may be $(X_1, X_2, X_3, \ldots, X_N)$, $(X_2, X_3, \ldots, X_N, X_1)$, $(X_3, \ldots, X_N, X_1, X_2)$, \ldots, $(X_N, X_1, \ldots, X_N-1)$.

Multi-Value Sampling

In accordance with further aspects of the disclosure, a sample $X_i$ of the function μ(x) may be computed from a combination of values at spaced intervals along the function μ(x). This may result in variance reduction for the sample $X_i$, which is beneficial in that even a small variance reduction in an individual sample $X_i$ may have a large impact on variance reduction for higher order terms of the power-series expansion. In at least one embodiment, the values for a sample $X_i$ may be determined at equally spaced intervals along the function μ(x), and the sample may be an average of the values.

Assuming, without lack of generality, the integration interval of the function μ(x) to be [0, L], one way to produce a sequence of unbiased and independent estimators is to use, for each order i, a single random number $x_i \in [0, L)$ to randomize a deterministic low-discrepancy set $u_1, \ldots, u_M \in [0, L)$ by a Cranley-Patterson rotation, defining the rotated set $x_{i,j}=x_i+u_j \mod L$), and estimating the integrals using Equation (11):

$$X_i = -\frac{1}{M}\sum_{j=1}^{M} \frac{\mu(x_{i,j})}{p(x_{i,j})} \quad (11)$$

If the integrand is continuous, the use of a low-discrepancy set can reduce the integration error to O(log(M)/M). Further error reduction may be obtained if the integrand is sufficiently smooth, which may be accomplished, for example, by replacing values in the low-discrepancy set with combinations of values, such as by an equidistant sampling tuple $u_j=j/M$. This may be used to potentially reduce the integration error to O(1/M) and may be equivalent to convolving the integrand with an M-point Dirac comb denoted by Equation (12):

$$\mu^{\otimes}(s) = \frac{1}{M}\sum_{j=1}^{M} \mu(s+u_j \mod L) \quad (12)$$

where s is a random offset in the integration interval [0, L).

Using multiple values for a single sample may require the value determiner 106 to perform more lookups of the function μ(x) when estimating transmittance (multiple lookups per sample). Despite this, the benefit to variance reduction may be greater than using those lookups as separate samples in the power-series estimation, even compared using a combination estimator described herein with single lookup samples. Convergence may be increase, for example, with the density of sampling combs with a large M. The large M may be compensated for using an aggressive truncation algorithm for the evaluation order N to limit the total number of values that need to be looked-up by the value determiner 106 for transmittance estimation.

Figure 3A:
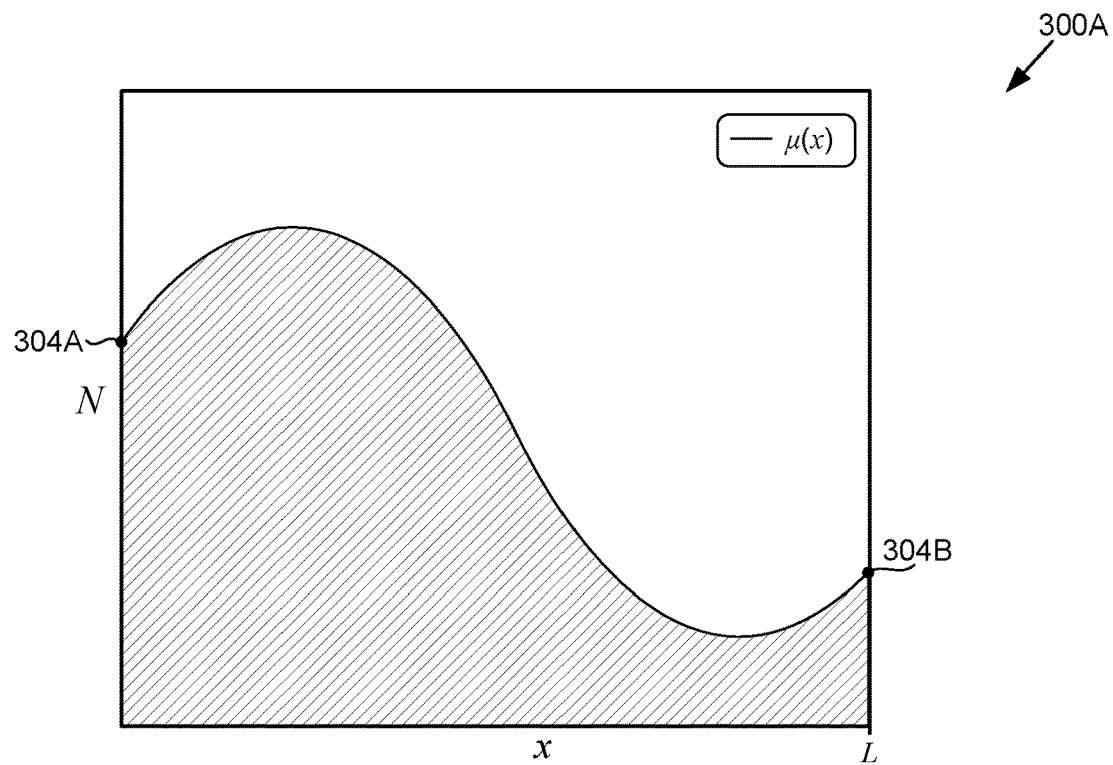
FIG. 3A is a graph of an example density function, in accordance with at least one embodiment of the present disclosure.
Figure 3B:
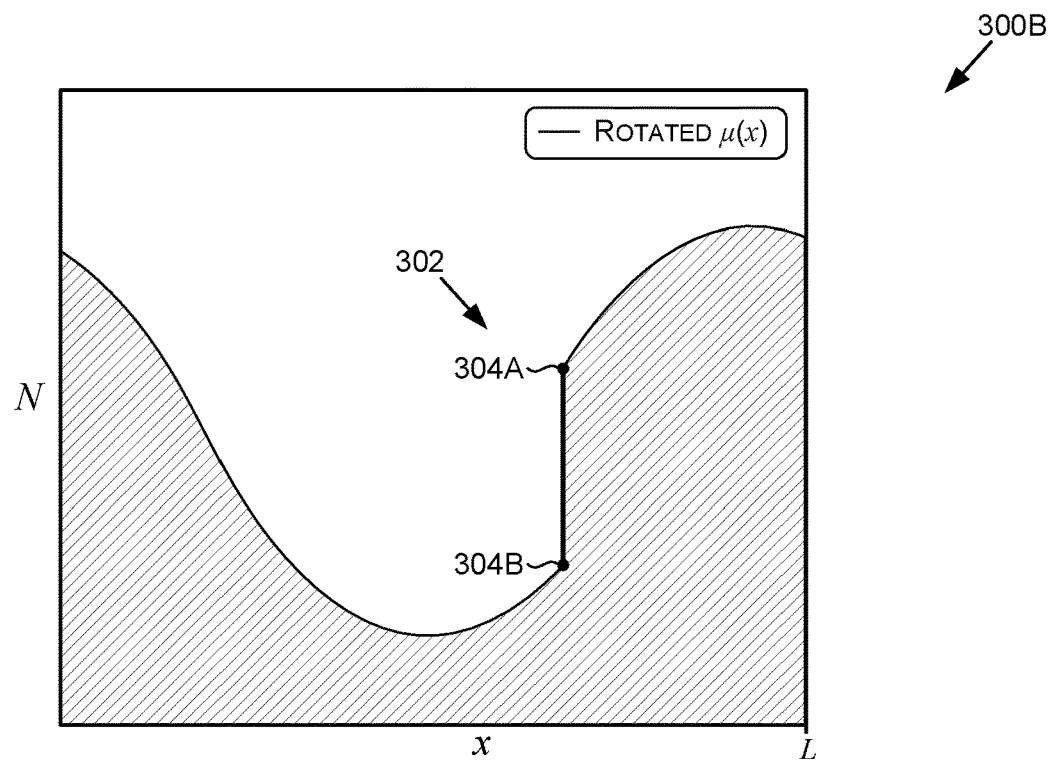
FIG. 3B is a graph of the example density function of FIG. 3A that is adjusted to include an artificial discontinuity, in accordance with at least one embodiment of the present disclosure.

The spacing of the values for a sample (using a Dirac Comb or otherwise) may introduce an artificial discontinuity in the integrand of the function μ(x). Referring now to FIGS. 3A and 3B, FIG. 3A is a graph 300A of an example density function, in accordance with at least one embodiment of the present disclosure and FIG. 3B is a graph 300B of the example density function of FIG. 3A that is adjusted to include an artificial discontinuity, in accordance with at least one embodiment of the present disclosure. As can be seen in FIG. 3A, the function μ(x) may define a continuous integrand between start and endpoints (0) and (L). However, multi-value sampling, for example, using Cranley-Patterson rotation, may result in a discontinuity 302 in the integration domain of the function μ(x) due to differences between values 304A and 304B. To illustrate the forgoing, shifting the set of uniform samples by a random number $x_i$ modulo L is equivalent to shifting the integrand denoted by equation (13):

$$\mu^{CP}(s)=\mu((x_i+s)\mod L) \quad (13)$$

With this transformation, the start and endpoints μ(0) and μ(L) get shifted to the point $x_i$, denoted by equation (14):

$$\lim_{s \to x_i^-} \mu^{CP}(s) = \mu(0) \quad (14)$$

$$\lim_{s \to x_i^+} \mu^{CP}(s) = \mu(L)$$

Thus, if the function μ(x) did have a bounded maximum slope, which is often the case, the shifted integrand that is being evaluated may not. As such, while a Cranley-Patterson rotation used with equidistant sampling can decrease integration error as the square of the sample count, the discontinuity 302 (e.g., infinite slope) would significantly reduce the convergence rate.

In accordance with aspects of the disclosure, a discontinuity (e.g., the discontinuity 302) may be compensated for based at least on determining a version of the function μ(x) that includes an alignment of a first point with a second point of the function μ(x). The version of the function μ(x) may, for example and without limitation, include the addition of a step function that linearly adjusts the function μ(x) so that a first point goes up and/or a second point goes down so as reduce or eliminate the discontinuity (e.g., so that the points match). In at least one embodiment, the discontinuity may be remedied by further reshuffling the density using an affine control variate to match the points of the discontinuity. For example, a zero-mean affine control variate may be subtracted as denoted by Equation (15):

$$\mu^*(s) := \mu(s) - \left(\mu(0) + \frac{s}{L}(\mu(L) - \mu(0))\right) + \frac{\mu(0) + \mu(L)}{2} \quad (15)$$

$$= \mu(s) + \left(\frac{1}{2} - \frac{s}{L}\right)(\mu(L) - \mu(0))$$

Using this approach, a sample(s) may be applied to the adjusted version of the function µ(x) to produce an output that is adjusted to compensate for the alignment and determine the transmittance. For example, mass may be added back to the entire function to line it up so that the integral is the same. A similar approach may be used to shift other locations of one or more discontinuities, which may appear in other examples of the function µ(x).

Figure 4A:
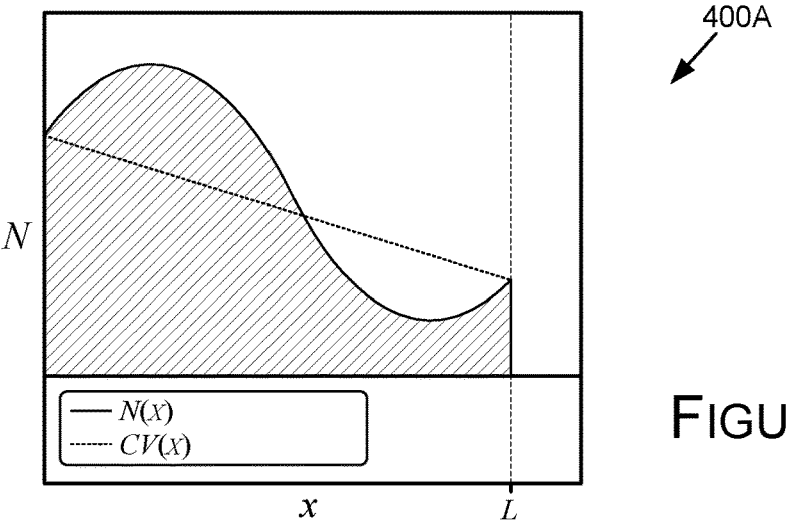
FIG. 4A is a graph of an example density function and a control variate, in accordance with at least one embodiment of the present disclosure.
Figure 4B:
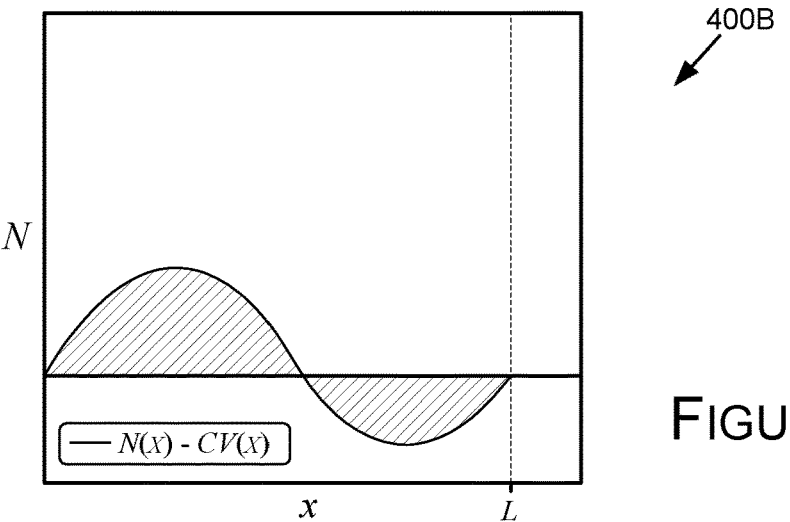
FIG. 4B is a graph of a residual of the density function and the control variate of FIG. 4A, in accordance with at least one embodiment of the present disclosure.
Figure 4C:
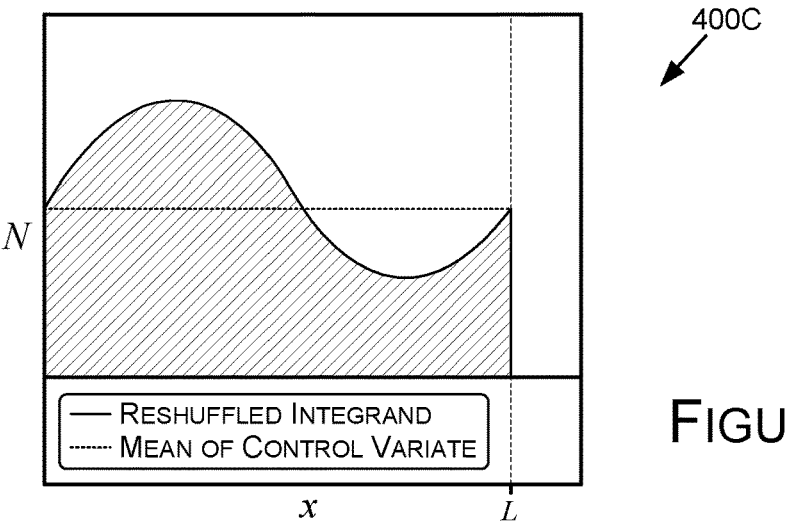
FIG. 4C is a graph of an example version of the density function of FIG. 4A reshuffled using the control variate of FIG. 4A along with a mean of the control variate, in accordance with at least one embodiment of the present disclosure.

Referring now to FIG. 4A, is a graph 400A of an example density function µ(x) and a control variate, in accordance with at least one embodiment of the present disclosure. FIG. 4B is a graph 400B of a residual of the density function µ(x) and the control variate of FIG. 4A, in accordance with at least one embodiment of the present disclosure. FIG. 4C is a graph 400C of an example version of the density function µ(x) of FIG. 4A reshuffled using the control variate of FIG. 4A along with a mean of the control variate, in accordance with at least one embodiment of the present disclosure. As can be seen, the reshuffled (and rotated in this example) version of the density function µ(x) does not include the discontinuity (e.g., an un-bounded slope) and therefore can be used may avoid potential problems that may occur when generating a sample from multiple values of the density function µ(x). It is noted that disclosed approaches may be used in other examples that do not necessarily generate a sample(s) from multiple values of the. For example, disclosed approaches may generally reshuffle the density function µ(x) to account for one or more discontinuities when sampling from the density function µ(x), whether or not the density function 82 (x) is further reshuffled for another purpose, such as multi-value sampling.

Pivot Determination

As described herein, the pivot determiner 108 may determine a pivot, or expansion point, for a power-series (e.g., a Taylor series) used to compute transmittance. The power-series may converge with fewer terms the closer the pivot is to the real integral of the function (x). This may be because different pivots correspond to different polynomial fits and result in different approximation errors as a function of the order N of the polynomial expansion of the power-series. Rather than arbitrarily or manually selecting the pivot, the pivot may be computed based at least in part on a combination of values of the function. For example, the pivot may correspond to an average or mean of the values of the function (x). In evaluating the exponential of an integral of the function µ(x), the true mean may be the best possible pivot that would result from setting the constant $\bar{\mu}$ to the mean of µ over the interval [a, b] so that the power-series expansion may converge exactly even at the zeroth order N=0. However, knowing the true mean of µ may be equivalent to knowing the integral being solved. Using an average or mean of the values of the function µ(x) that are looked up may serve as an approximation of the mean, which improves with the number of values and converges to an ideal result.

In at least one embodiment, the transmittance estimation is computed from the power-series expansion using one or more of the values that were used to compute the pivot. However, this may result in a biased estimation of the transmittance. For an unbiased estimation, the transmittance may be computed using all different values of the function than used to compute the pivot. In at least one embodiment, a procedure analogous to rotations (or using different possible permutation of orders of the samples) may be used to effectively increase the total number of samples used for computing the pivot, for example, while retaining an unbiased estimator. For example, considering a single sample added to the original samples N used for estimation, where X is the entire set of samples, it may be sufficient to consider in turn (e.g., form an average of) all the N+1 estimators resulting from taking each $X_i$ as the pivot, using the samples $X \setminus \{X_i\}$ to build a combination estimator, and averaging the result. The corresponding unbiased estimator of order N may have a shape denoted by Equation (16):

$$T = \frac{1}{N+1} \sum_{p=1}^{N+1} \int_N (X_p, X \setminus \{X_p\}) \quad (16)$$

where function $f_N$ is given by Equation (17):

$$\int_N (X_p, X) = e^{X_p} \sum_{k=0}^{N} \frac{m_k(X - X_p)}{k! \, p_k} \quad (17)$$

where $m_k$ may be the k-th symmetric means, each $X_i$ is an independent unbiased estimator of the integral of the function µ(x), and $X-X_p$ subtracts $X_p$ from each element of the set. Thus, rather than using a single sample for the pivot, the pivot may be evaluated for different orderings of the samples.

Figure 5:
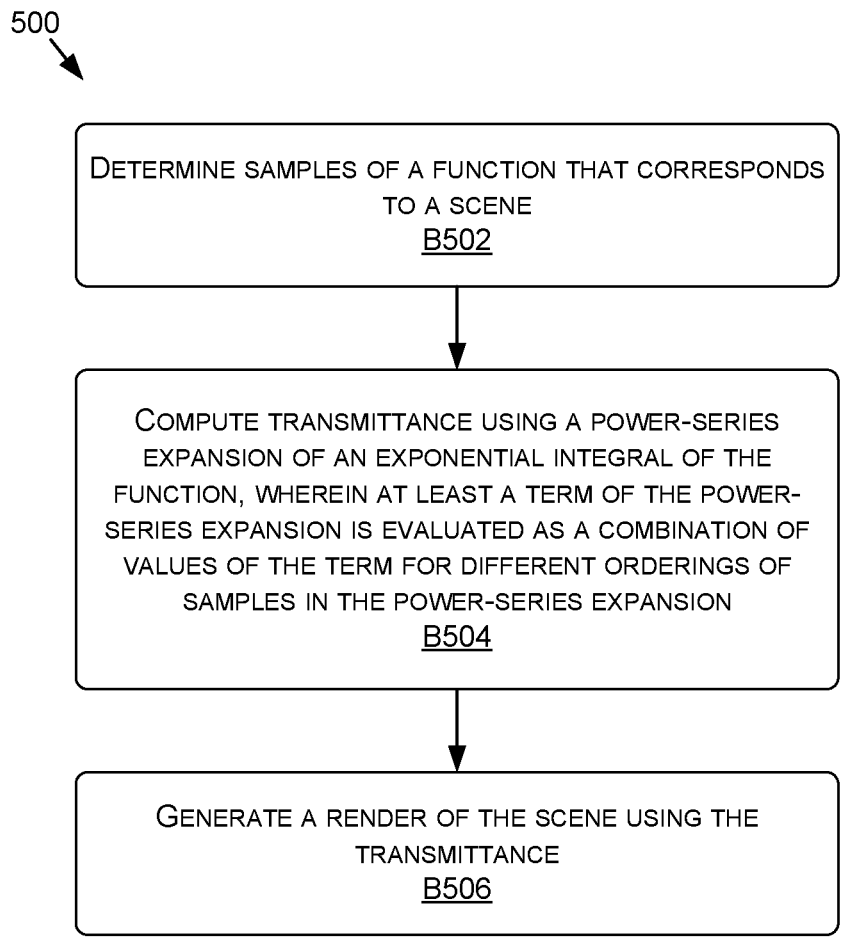
FIG. 5 is a flow diagram showing a method for computing transmittance using a power-series expansion of an exponential integral of a function, where a term is evaluated as a combination of values for different orderings of samples in the power-series expansion, in accordance with some embodiments of the present disclosure.

Now referring to FIG. 5, each block of method 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the transmittance estimation system 100 of FIG. 1. However, the methods may additionally or alternatively be executed by any one system, or any combination of systems, including, but not limited to, those described herein.

FIG. 5 is a flow diagram showing a method 500 for computing transmittance using a power-series expansion of an exponential integral of a function where a term is evaluated as a combination of values for different orderings of samples in the power-series expansion, in accordance with some embodiments of the present disclosure. The method 500, at block B502, includes determining samples of a function that corresponds to a scene. For example, the transmittance determiner 104 may use the value determiner 106 to determine a plurality of samples $X_i$ of the function µ(x) that corresponds to density of particles at locations in the scene 110.

The method 500, at block B504 includes computing transmittance using a power-series expansion of an exponential integral of the function, wherein at least a term of the power-series expansion is evaluated as a combination of values of the term for different orderings of samples in the power-series expansion. For example, the transmittance determiner 104 may compute transmittance through the locations using a power-series expansion of an exponential integral of the function $\mu(x)$ (e.g., using a combination estimator described here), wherein at least a term Y of the power-series expansion is evaluated as a combination of values of the term for different orderings of samples from the plurality of samples $X_i$ in the power-series expansion.

The method 500, at block B506 includes generating a render of the scene using the transmittance. For example, the image renderer 102 may render the scene 110 using the transmittance.

Figure 6:
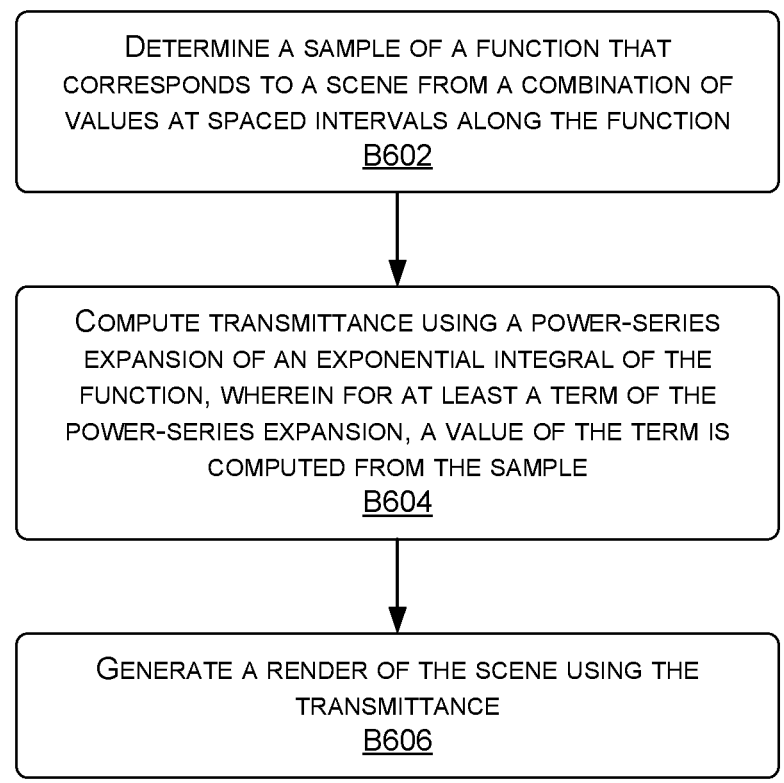
FIG. 6 is a flow diagram showing a method for computing transmittance using a power-series expansion of an exponential integral of a function, where a term is evaluated using a sample that is determined from a combination of values of the function, in accordance with some embodiments of the present disclosure.

FIG. 6 is a flow diagram showing a method 600 for computing transmittance using a power-series expansion of an exponential integral of a function, where a term is evaluated using a sample that is determined from a combination of values of the function, in accordance with some embodiments of the present disclosure. The method 600, at block B602, includes determining a sample of a function that corresponds to a scene from a combination of values at spaced intervals along the function. For example, the transmittance determiner 104 may use the value determiner 106 to determine a plurality of samples $X_i$ of the function $\mu(x)$ that corresponds to density of particles at locations in the scene 110. At least one of the samples $X_i$ may be computed from multiple values of the function $\mu(x)$, for example, using equally spaced intervals determined using Cranley-Patterson rotation of the function $\mu(x)$.

The method 600, at block B604 includes computing transmittance using a power-series expansion of an exponential integral of the function, wherein for at least a term of the power-series expansion, a value of the term is computed from the sample. For example, the transmittance determiner 104 may compute transmittance through the locations using a power-series expansion of an exponential integral of the function $\mu(x)$, wherein for at least a term Y of the power-series expansion, a value of the term is computed from the sample. In at least one embodiment, a control variate may be used to adjust the function in order to account for a discontinuity, which may be caused by rotating or otherwise reshuffling the function $\mu(x)$.

The method 600, at block B606 includes generating a render of the scene using the transmittance. For example, the image renderer 102 may render the scene 110 using the transmittance.

Figure 7:
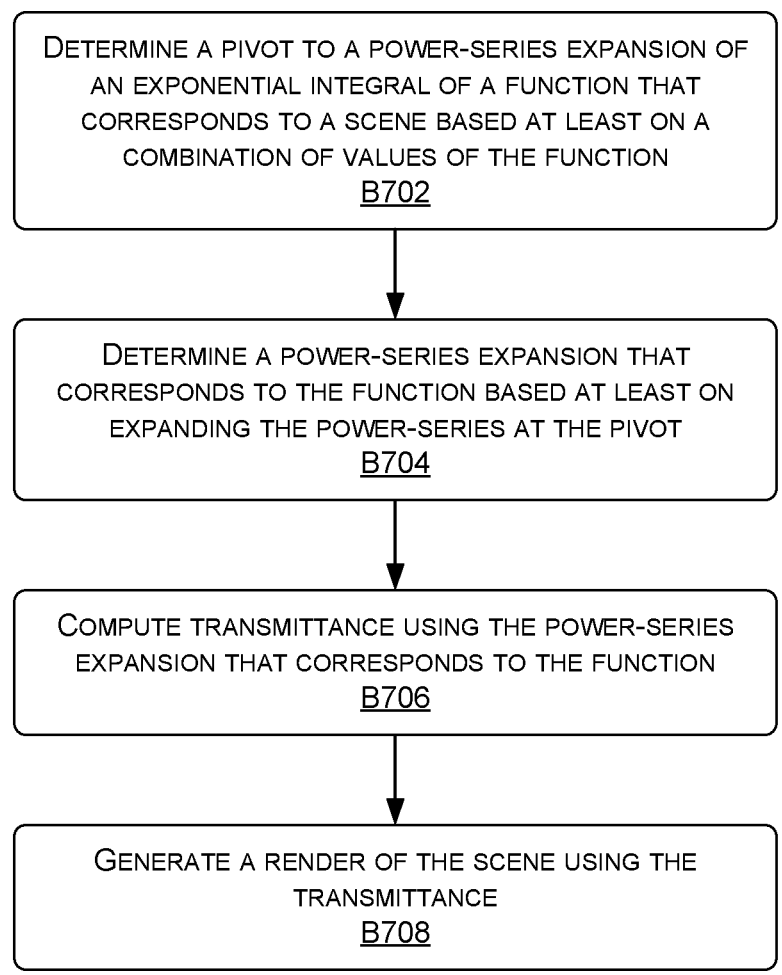
FIG. 7 is a flow diagram showing a method for computing transmittance using a power-series of an exponential integral of a function, where the power-series is expanded using a pivot determined from values of the function, in accordance with some embodiments of the present disclosure.

FIG. 7 is a flow diagram showing a method 700 for computing transmittance using a power-series of an exponential integral of a function, where the power-series is expanded using a pivot determined from values of the function, in accordance with some embodiments of the present disclosure. The method 700, at block B702, includes determining a pivot to a power-series expansion of an exponential integral of a function that corresponds to a scene based at least on a combination of values of the function. For example, the transmittance determiner 104 may use the pivot determiner 108 to determine a pivot to a power-series of an exponential integral of the function $\mu(x)$ based at least on a combination of values of the function, where the function corresponds to density of particles at locations in the scene 110.

The method 700, at block B704 includes determining a power-series expansion that corresponds to the function based at least on expanding the power-series at the pivot. For example, the transmittance determiner 104 may determine a power-series expansion that corresponds to the function $\mu(x)$ based at least on expanding the power-series at the pivot.

The method 700, at block B706 includes computing transmittance using the power-series expansion that corresponds to the function. For example, the transmittance determiner 104 may compute transmittance through the locations using the power-series expansion that corresponds to the function $\mu(x)$.

The method 700, at block B708 includes generating a render of the scene using the transmittance. For example, the image renderer 102 may render the scene 110 using the transmittance.

Example Computing Device

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units(TPUs), Data Processing Units (DPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Data Center

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs"), any number of data processing units ("DPUs"), or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, DPUs, GPUs, and/or other processors may be grouped within one or more racks to provide compute resources to support one or more workloads. The one or more racks may also include any number of power modules, cooling modules, and/or network switches, in any combination.

The resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for the data center 900. The resource orchestrator 922 may include hardware, software, or some combination thereof.

In at least one embodiment, as shown in FIG. 9, framework layer 920 may include a job scheduler 944, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 944 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 944. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining samples of a function that corresponds to density of particles in a Three-Dimensional (3D) scene;
   computing transmittance corresponding to a fractional visibility of the particles using a power-series expansion associated with the function, wherein at least one value of a term of the power-series expansion is computed using a combination of values corresponding to different orderings of the samples within the term; and
   generating a render of the 3D scene using the transmittance.

2. The method of claim 1, wherein the term is computed using an average of the samples.

3. The method of claim 1, wherein for each term of a plurality of terms of the power-series expansion, the term is computed as a combination of values of the term for a different set of the samples.

4. The method of claim 1, wherein the transmittance corresponds to a combination of solutions to the power-series expansion that accounts for each potential ordering of the samples in the power-series expansion.

5. The method of claim 1, wherein values of terms of the power-series expansion are computed using elementary symmetric sums of the samples.

6. The method of claim 1, wherein the different orderings are in a portion of the term that computes a product of the samples.

7. The method of claim 1, wherein the computing of the transmittance is from a plurality of terms of the power-series expansion and the plurality of terms are evaluated based at least on applying the samples to the power-series expansion using each possible permutation of orders of the samples.

8. The method of claim 1, wherein the computing of the transmittance is from a plurality of terms of the power-series expansion and the plurality of terms are evaluated based at least on applying the samples to the power-series expansion while shifting one or more orders of the samples in the power-series expansion.

9. The method of claim 1, wherein each ordering of the different orderings corresponds to a unique assignment of the samples to a portion of the term.

10. A system comprising:
    one or more processing units to execute operations comprising:
    determining a sample of a function that corresponds to density of particles in a Three-Dimensional (3D) scene using a statistical combination of values spaced at one or more intervals along the function;
    computing transmittance using a power-series expansion associated with the function, wherein the power-series expansion is computed from the sample; and
    generating a render of the 3D scene using the transmittance, wherein the transmittance corresponds to a fractional visibility of one or more particles in the 3D scene.

11. The system of claim 10, wherein the combination comprises an average of the values.

12. The system of claim 10, wherein the sample corresponds to optical thickness and the values correspond to extinction coefficients along the function.

13. The system of claim 10, wherein a result of the function is computed based at least on:
    determining a version of the function that includes an alignment of a first point with a second point of the function; and
    applying the sample to the version of the function to produce an output of the version of the function, wherein the transmittance is based at least on adjusting the output to compensate for the alignment.

14. The system of claim 10, wherein a term of the power-series expansion is computed from one or more values of the term for one or more different orderings of one or more samples of the function in the power-series expansion.

15. The system of claim 10, wherein the system is comprised in at least one of:
    a system for performing simulation operations;
    a system for performing deep learning operations;
    a system implemented using an edge device;
    a system incorporating one or more virtual machines (VMs);
    a system implemented at least partially in a data center; or
    a system implemented at least partially using cloud computing resources.

16. A processor comprising one or more circuits to:
determine a pivot to a power-series associated with a function based at least on a combination of values of the function, the function corresponding to density of particles in a Three-Dimensional (3D) scene;
determine a power-series expansion based at least on expanding the power-series at the pivot;
compute transmittance using the power-series expansion, the transmittance corresponding to a fractional visibility of one or more particles in the 3D scene; and
generate a render of the 3D scene using the transmittance.

17. The processor of claim 16, wherein the transmittance is computed using all different values of the function used to determine the pivot.

18. The processor of claim 16, wherein the transmittance is computed using at least one of the values used to determine the pivot.

19. The processor of claim 16, wherein the combination comprises an average of the values.

20. The processor of claim 16, wherein the transmittance is through one or more of a cloud, haze, smoke, fog, rain, or snow in the 3D scene.

\* \* \* \* \*